(No Model.)
G. W. BALDRIGE.
TYPE WRITING MACHINE.
No. 376,624. Patented Jan. 17, 1888.
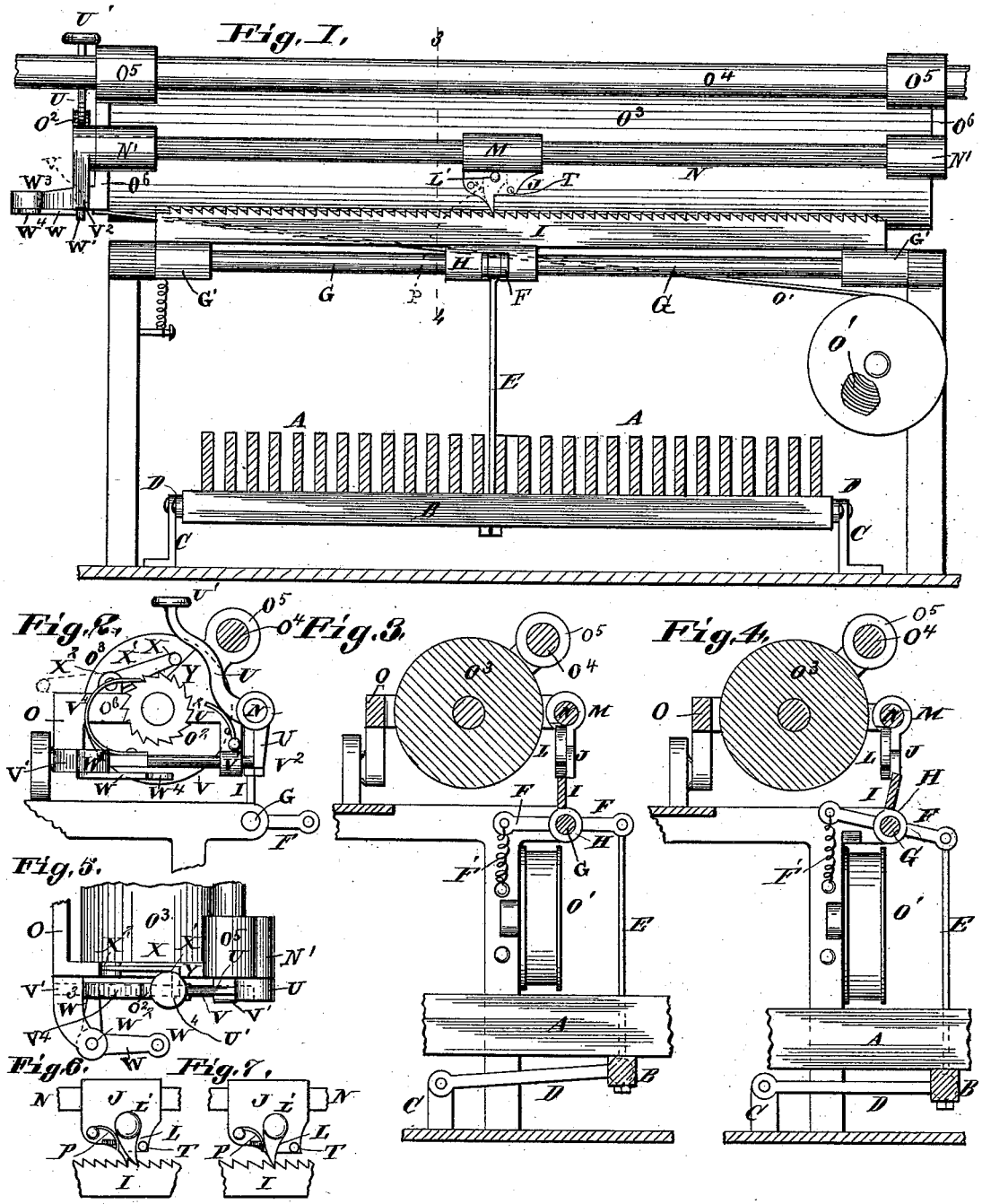
Witnesses
Charles Pickles,
H. S. Knight
Inventor
George. W. Baldrige,
By his Attorneys
Knight Bro

UNITED STATES PATENT OFFICE.

GEORGE W. BALDRIGE, OF ST. LOUIS, MISSOURI.

TYPE-WRITING MACHINE.

SPECIFICATION forming part of Letters Patent No. 376,624, dated January 17, 1888.

Application filed July 2, 1886. Serial No. 206,959. (No model.)

*To all whom it may concern:*

Be it known that I, GEORGE W. BALDRIGE, of the city of St. Louis, in the State of Missouri, have invented a certain new and useful Improvement in Type-Writing Machines, of which the following is a full, clear, and exact description, reference being had to the accompanying drawings, forming part of this specification, and in which—

Figure 1 is a transverse vertical section through the keys and bed-plate of the machine, showing the carriage in rear elevation and illustrating my invention. Fig. 2 is an end view of the carriage. Figs. 3 and 4 are vertical transverse sections of the carriage, taken on line 3 4, Fig. 1. Fig. 5 is a detail top view of the carriage. Figs. 6 and 7 are details illustrating the operation of the carriage-dogs.

My invention relates to certain improvements in type-writers and improvements that may be applied to type-writers in use; and my invention consists in features of novelty, hereinafter fully described, and pointed out in the claims.

Referring to the drawings, A represents the key-levers of a type-writer, beneath which is located a cross-bar, B, pivoted to standards or supports C by arms D, extending rearward from the latter. The bar is connected by a rod, E, to the outer end of a lever or arm, F, pivoted on a shaft or rod, G, running across the machine beneath the carriage and supported at its ends on the sides of the main frame, the arm or lever preferably having a hollow hub, H, through which the rod or shaft G passes, as shown in Figs. 1, 3, and 4. On the hub H is formed or secured a rack, I, which is supported at its ends by collars G', through which the shaft G passes, and the notches or teeth of the rack are upon its upper edge, and into these notches or teeth there engages a fixed dog, J, and a pivoted dog, L. The dog J has preferably a hollow hub, M, through which passes a rod, N, which is secured to and carried by socket-bearings N' on the paper-carriage O of the machine, having paper-roller O³, and which may be supported by a rod, O⁴, passing through lugs O⁵ on the end plates, O⁶, of the carriage, as shown in Fig. 1, and the dog L is preferably pivoted at L' to the dog J.

It is common in some type writers—as, for instance, the Remington—to provide two swinging dogs, (one of which is pivoted,) with which engages a stationary rack. My invention differs from this construction in that the dogs do not swing in the forward movement of the carriage, but are stationary, and one is pivoted, as stated, and the rack, instead of being fixed or rigid, is arranged to swing so that either dog may be engaged with the teeth. Thus when a key-lever is operated the bar B is depressed, and, through means of the rod E and lever F, it rocks or moves the rack from the position shown in Fig. 3 to the position shown in Fig. 4, and in doing this it moves the rack from the pivoted dog L into engagement with the fixed dog J. As soon as the pivoted dog has been released, it is forced by a spring, P, against a stop, T, as shown in Fig. 6, so that when the rack is rocked or moved back by the spring F', connecting the inner end of the arm F to the fixed part of the machine, this dog L will engage the next tooth on the rack behind the one engaged by the fixed dog and the one last engaged by it. As soon as the fixed dog is disengaged from the rack on the return of the rack, the carriage is pulled forward by a spring, O', forcing the dog against the spring from the position shown in Fig. 6 to the position shown in Fig. 7, the carriage being thus moved the distance required for one letter. The next time a key-lever is depressed the same operation is performed, the rack being rocked from engagement with the pivoted dog into engagement with the fixed dog, the pivoted dog then being forced forward by the spring P, the rack then being moved from the fixed dog to the pivoted dog, and then being pulled forward by the spring O' the distance required for a letter or character.

There are advantages in having fixed or non-swinging dogs secured to the carriage and a swinging or rocking rack secured to the frame of the machine over the reverse of this, among the principal of which is lightness of the carriage and the consequent ease and rapidity of movement. The rack adds considerable weight to the carriage when attached to and carried by it, and this weight adds to the power necessary to bring the carriage back when a new line is to be written, and also adds to the momentum and inertia of the carriage, resulting in slowness of movement.

After all or part of a line has been written and it is desired to return the carriage for a new line, the dogs are disengaged from the rack by some suitable means. I have shown for this purpose a lever, U, secured to the shaft N, with a button or head, U', on its upper end. By pressing on this button or head U' the shaft N is turned sufficiently far for the dogs to be disengaged from the rack, and the carriage is then at liberty to be moved back or in either direction; or the dogs may be disengaged from the rack by the mechanism which also turns the roller of the carriage to shift the paper for a new line, this mechanism consisting of a shaft or rod, V, supported and sliding in bearings V', by which it is secured to an end plate of the carrriage, and which is connected at W' to a bell-crank lever, W, pivoted at W² to an arm, W³, extending from the end of the carriage. This lever W is preferably made in the form of a bell-crank lever, its outer end, W⁴, serving as a means by which it may be moved to throw the rod V. The outer end of the rod V bears against, or may bear against, a projection, V², of the lever U, and in doing so turns the shaft N, to which this lever is secured, disengaging the dogs from the rack. This rod V carries a spring-pawl, V⁴, as shown in Fig. 2, and which engages the ratchet-wheel O² of the paper-roller. Thus as the rod V is moved toward the projection V² the pawl V⁴, bearing against the ratchet-wheel O², causes the turning of the paper-roller to shift the paper for a new line. By this means the dogs may be disengaged from the rack at the same time the paper-roller is turned, and vice versa. When these parts are operated, they are restored to normal position by a spring, U², bearing against the lever U. (See Fig. 2.)

Each time this mechanism is operated and each time the lever U is operated, as above described, the lever comes against a projection, X, on an arm, X', pivoted at X² to the end of the carriage. This acts as a stop, so that the roller is only turned the proper distance for one line. Should it be desired to turn the roller farther than the distance for one line, it may be done by throwing the arm over from the position shown in full lines, Fig. 2, to the position shown in dotted lines, same figure, so that the lever U will not come against the projection X. The arm is held in the position shown in full lines, Fig. 2, by bearing against a ledge, Y, on the carriage, as shown in Figs. 2 and 5.

I claim as my invention—

1. The combination of a main frame having a transverse shaft, G, an oscillating rack, I, mounted on the shaft, means, substantially as described, for swinging the rack, a carriage having end plates, O⁶, formed with lugs O⁵ and socket-bearings N', rod O⁴, for supporting the carriage at the rear, shaft N, secured in the socket-bearings, pendent fixed pawl J, formed with hub M, by which it is supported on the shaft N, stop T, secured to the fixed pawl, spring P, secured to the fixed pawl, pendent pivoted pawl secured to the fixed pawl between the spring and stop, and means, substantially as described, for advancing the carriage.

2. The combination of the carriage O, rod O⁴, for supporting the carriage, the rock-shaft N, supported on the carriage, the hub M, rigidly secured to the shaft, having fixed dog J, a stop and pivoted spring-dog, L, a swinging rack, I, a lever, U, keyed to the rock-shaft, having a projection, V², a spring bearing on the lever, the sliding rod V, acting on the projection, and a bell-crank lever, W, for operating the sliding rod in opposition to the spring U².

3. The combination of the carriage O, having paper-roller O³ and ratchet-wheel O², rod O⁴, for supporting the carriage, the rock-shaft N, supported on the carriage, the hub M, rigidly secured to the shaft, having fixed dog J, a stop and pivoted spring-dog, L, a lever, U, keyed to the rock-shaft, having a projection, V², a spring bearing on the lever, the sliding rod V, acting on the projection, having a spring pawl, V⁴, engaging the ratchet-wheel, and means, substantially as described, for operating the sliding rod.

GEO. W. BALDRIGE.

Witnesses:
SAML. KNIGHT,
BENJN. A. KNIGHT.